United States Patent [19]

Petersen

[11] Patent Number: 5,562,055

[45] Date of Patent: Oct. 8, 1996

[54] STRUT PACKER

[76] Inventor: Sherwin H. Petersen, Box 327, Rose Valley, Saskatchewan, Canada, S0E 1M0

[21] Appl. No.: 265,765

[22] Filed: Jun. 27, 1994

[30] Foreign Application Priority Data

Dec. 6, 1993 [CA] Canada .................................. 2110736

[51] Int. Cl.⁶ ...................................................... A01C 5/06
[52] U.S. Cl. ............................ 111/195; 172/200; 172/538
[58] Field of Search ..................................... 172/200, 538, 172/551; 111/195, 194, 196

[56] References Cited

U.S. PATENT DOCUMENTS

| | | | |
|---|---|---|---|
| 4,043,281 | 8/1977 | Sorlie et al. | 111/158 |
| 4,213,408 | 7/1980 | West et al. | 111/195 X |
| 4,417,530 | 11/1983 | Kopecky | 111/73 |
| 4,579,071 | 4/1986 | Johnson | 111/195 |
| 4,686,914 | 8/1987 | Schaaf et al. | 111/73 |
| 4,691,645 | 9/1987 | Anderson | 111/195 X |
| 4,760,806 | 8/1988 | Bigbee et al. | 111/195 X |
| 4,926,767 | 5/1990 | Thomas | 111/194 X |
| 5,035,190 | 7/1991 | Grimes | 111/195 |

*Primary Examiner*—Dave W. Arola
*Assistant Examiner*—Christopher J. Novosad
*Attorney, Agent, or Firm*—Murray E. Thrift; Adrian D. Battison

[57] ABSTRACT

A packer is mounted on a tool shank of an agricultural cultivator. It includes a guide tube slideably and rotatably mounted on a rigid seed tube mounted directly on the shank. The guide tube is biased downwardly by a compression spring surrounding the seed tube. Provision is made for adjusting the position of the packer wheel to accommodate different seeding depths and packer pressures.

19 Claims, 3 Drawing Sheets

STRUT PACKER

FIELD OF THE INVENTION

The present invention relates to agricultural packers and more particularly to a shank mounted packer.

BACKGROUND

Packers of various forms have been used to pack soil around newly planted seeds. The objective with any such packer is to ensure that loose soil around freshly planted seeds is uniformly compacted into engagement with the seeds. The present invention aims at the provision of a novel packer for this purpose that displays one or more advantages over the packers previously used.

SUMMARY

According to the present invention there is provided a packer for mounting on a tool shank of an agricultural cultivator, the packer comprising:

an elongate support member;

mounting means mounting the support member on the shank at the rear side of the shank;

guide means slidable along the support member;

resilient means biasing the guide means downwardly along the support member; and packer means mounted on the guide means at the rear side of the shank for packing soil behind the shank.

The packer mounts directly on the shank so that it may pack soil immediately behind the seed being deposited. This also permits the packer to be mounted on most if not all seeders.

It is preferred that the packer support is a seed tube leading to the seed boot. The guide means may then be a tube mounted to slide and rotate on the seed tube. With this integration of the seed tube into the packer, the packer is positioned closely behind the seed boot to provide good tracking of the furrow. There is also a significant reduction in overall manufacturing costs. The rotatable mounting of the packer allows it to follow the shank as a caster wheel, thus minimizing side loading on the shank.

The seed tube is preferably mounted using the shovel or sweep mounting bolts at the bottom of the shank and a u-bolt above. This provides a simple, easy to install arrangement.

Preferably, the packer is a wheel that is adjustably mounted on the guide means so that the packing pressure can be controlled.

With the present invention, the packer has a high trash clearance capability, owing to its resilient, swiveling mounting and its position close behind the shank.

BRIEF DESCRIPTION OF THE DRAWINGS

In the accompanying drawings, which illustrate an exemplary embodiment of the present invention:

FIG. 4 is a view along line 4—4 of FIG. 1; and

DETAILED DESCRIPTION

Figure 1:
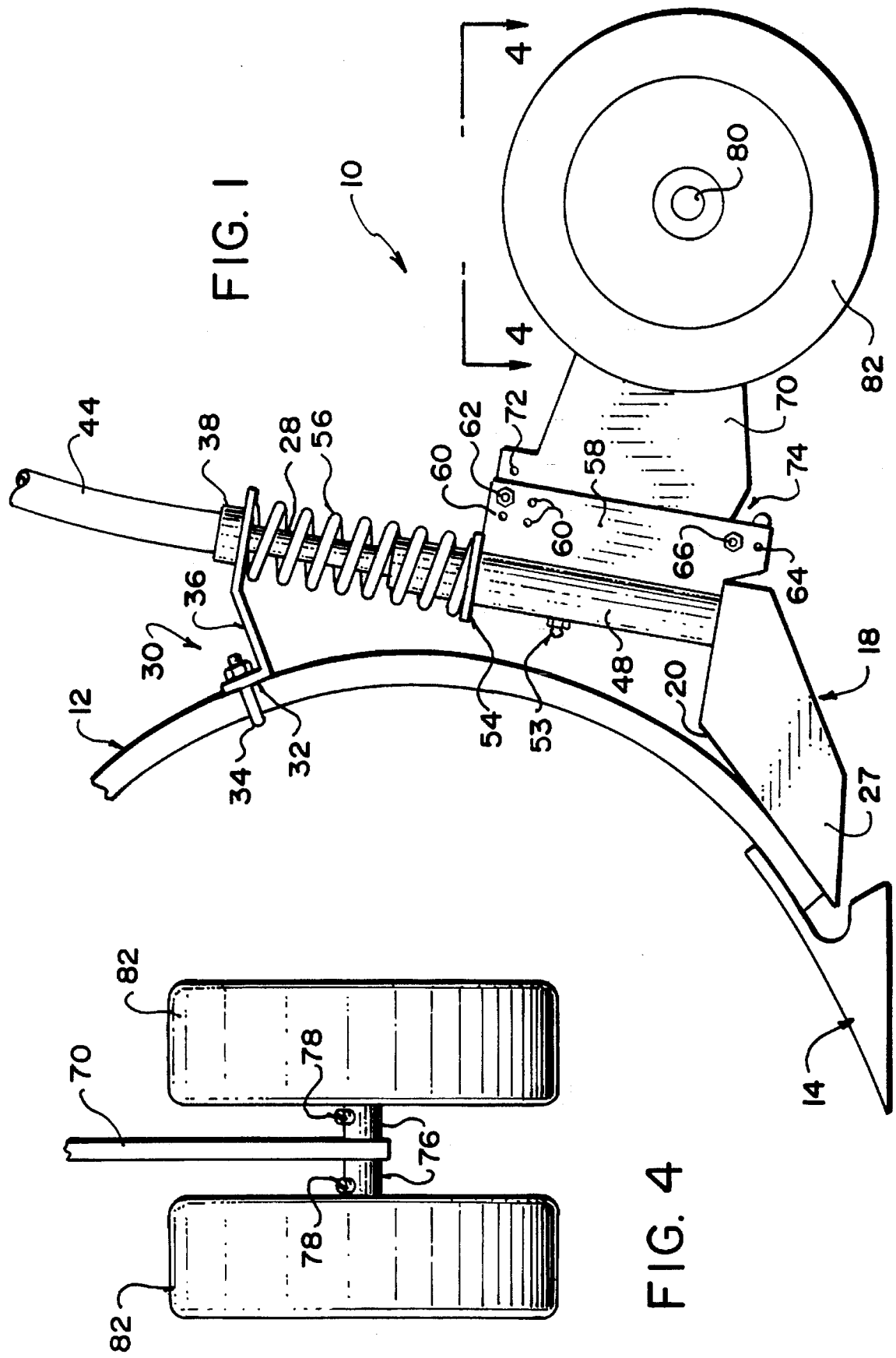
FIG. 1 is a side elevation of a packer according to the present invention mounted on a shank.
Figure 2:
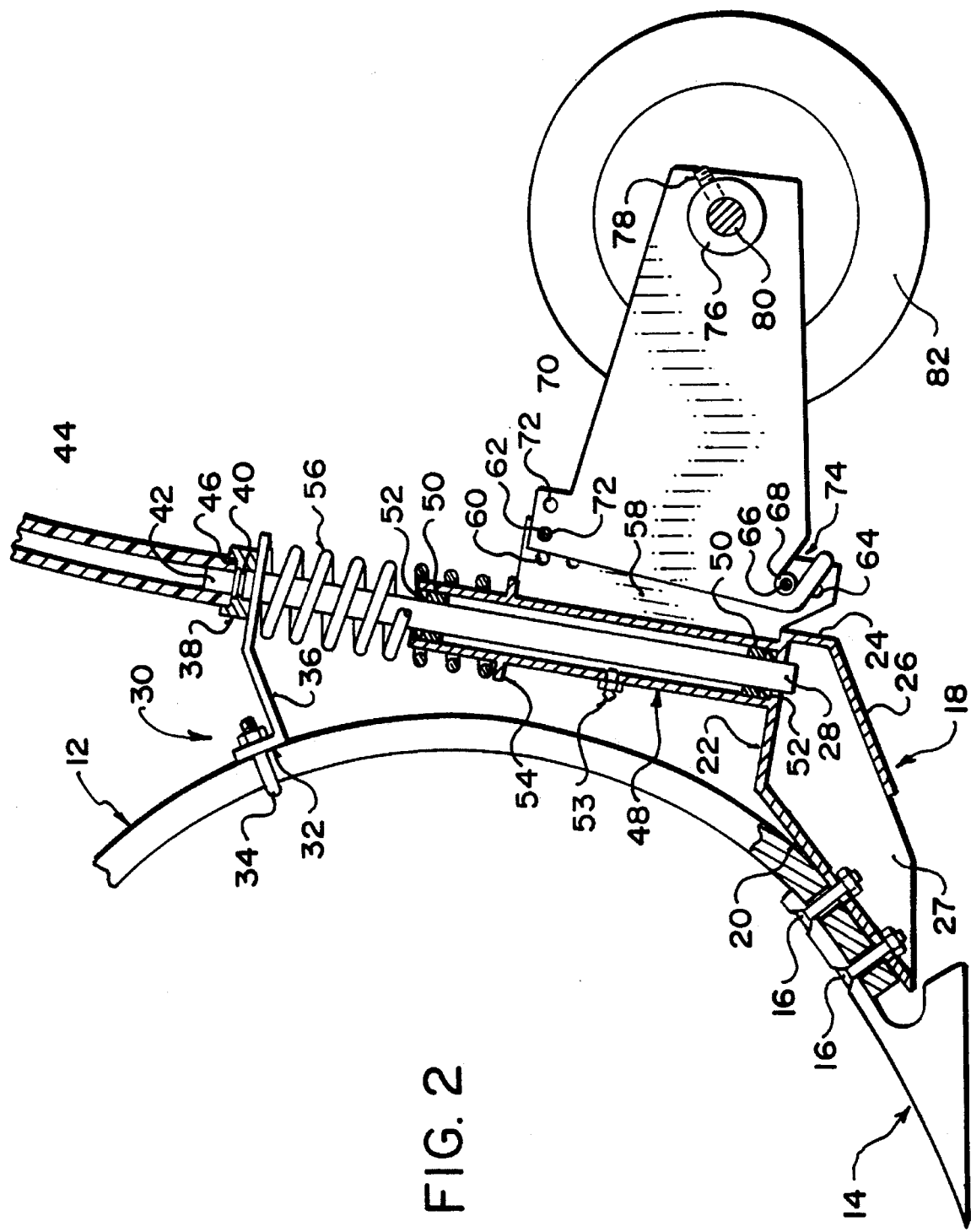
FIG. 2 is a view like FIG. 1, partially in section.

Referring to the accompanying drawings, there is illustrated a packer 10 mounted on a cultivator shank 12 of conventional form. The shank carries a sweep 14 at its lower end, mounted on the shank by the conventional mounting bolts 16 (FIG. 2).

The mounting bolts 16 are also used to mount upon the shank a seed boot 18 positioned immediately behind the shank 12 and the sweep 14. The seed boot includes a front wall 20 extending along the back side of the shank and fastened to the shank by the mounting bolts. At the upper end of the boot 18 is a top wall 22 that extends rearwardly to a back wall 24. A bottom wall 26 slopes downwardly to the front from back wall 24. The sides of the seed boot 18 are closed by two side walls 27. The bottom of the seed boot, in front of bottom wall 26, is open.

The top wall 22 of the seed boot is integral with an upwardly extending, rigid seed tube 28. Near the upper end of the seed tube is a bracket 30. This bracket includes a plate 32 extending across the back side of the shank and connected to it by a U-bolt 34. An arm 36 extends from the plate and carries a snap ring collar 38. The seed tube 20 has a groove 40 near its upper end to engage releasably in the collar 38. At the upper end of the seed tube 28 is a reduced diameter section 42 connected to a flexible seed tube 44. The end of the flexible tube 44 is seated in a countersunk end 46 of the collar 38.

The seed tube 28 serves as an elongate support for a guide tube 48 mounted both slidably and rotatably on the seed tube. The guide tube includes two bushings 50 with accompanying seals 52 near its opposite ends to enable the desired sliding and pivoting movement on the seed tube 28. The guide tube is fitted with a grease nipple 53 so that the interior of the tube may be packed with grease to ensure free movement on the seed tube support and extended life. Part way along the guide tube is a spring seat 54 that engages the bottom end of a compression spring 56 surrounding the upper part of the seed tube. At its upper end, the spring seats on the arm 36 so as to bias the guide tube 48 downwardly along the seed tube. The guide tube 48 carries two flanges 58 that extend outwardly from the tube. Each of the flanges has an array of four mounting holes 60 near the top of the flange for accommodating a mounting bolt 62. At the bottom of the flange are two additional mounting holes to receive a mounting bolt 66. The bolt extends between the two flanges and carries a bushing 68 that serves as a spacer between the two flanges.

Mounted between the flanges on bolt 62 and bushing 64 is a wheel mounting plate 70. This has two mounting holes 72 at the upper end for selective engagement with the mounting bolt 62 and a slot 74 near the bottom side of the plate for engagement on the bushing 68. Near the back end of the plate 70 are two mounting tubes 76 projecting from opposite sides of the plate. Each tube has a radial, threaded bore to receive a set screw 78 that fixes an axle 80 of a packer wheel 82 in the mounting tube. Two packer wheels are provided in this embodiment, on opposite sides of the mounting plate 70.

Each of the mounting holes 72 may be aligned with any pair of aligned mounting holes 60 in the flanges 58. Similarly, the slot 74 may line up with either of the mounting holes 64. This allows the packer wheel to be adjusted in position relative to the flanges 58 so as to control the force of a packer wheel in use, and to accommodate different seeding depths.

Figure 5:
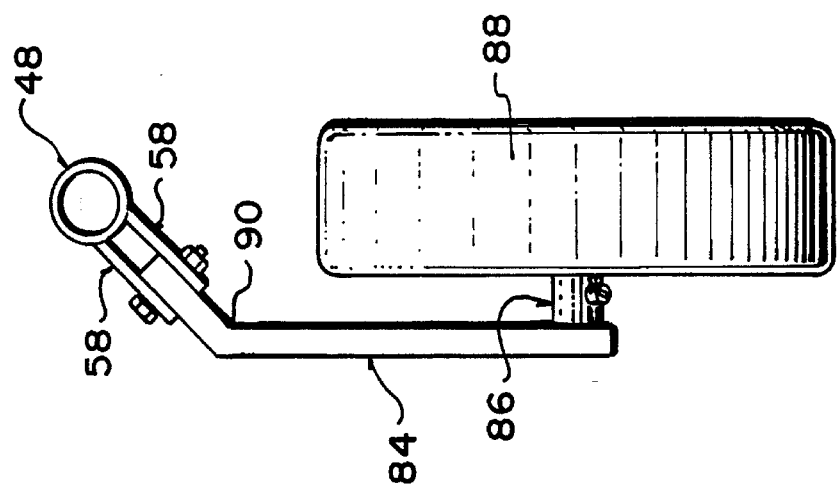
FIG. 5 is a view like FIG. 4, showing a single packer wheel embodiment.
Figure 3:
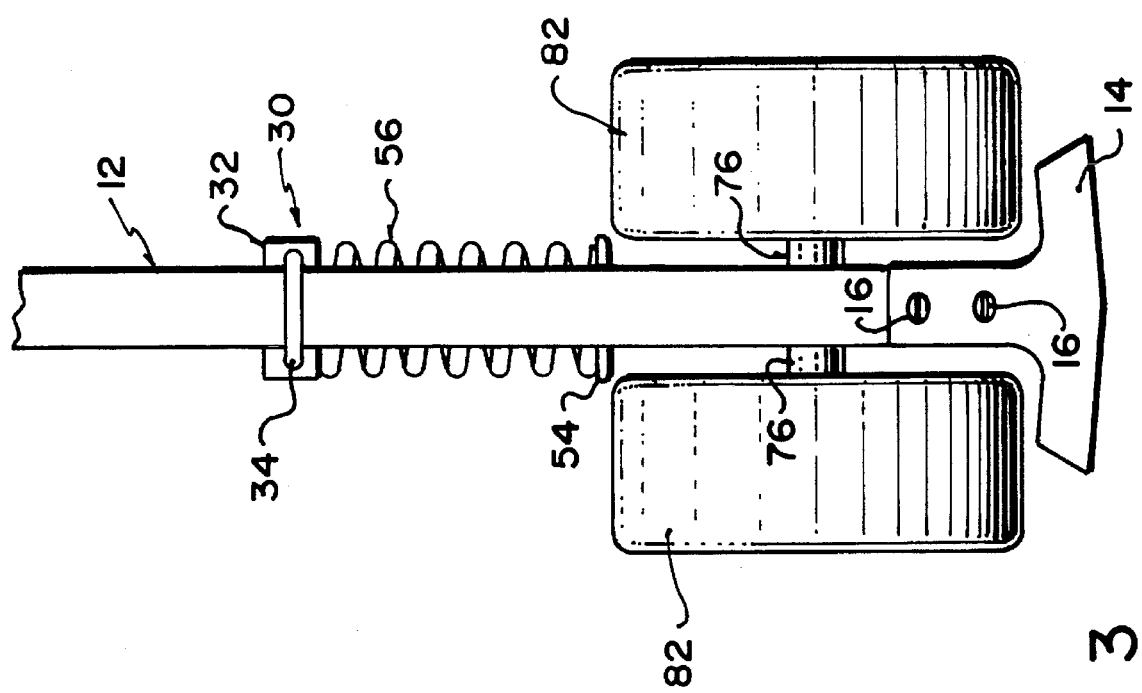
FIG. 3 is a front elevation of the arrangement of FIG. 1.

An alternative embodiment of the invention is illustrated in FIG. 5, where the mounting plate 84 is shown as having a single mounting tube 86 carrying a single packer wheel 88. In front of the packing wheel, the mounting plate has an obtuse angle bend 90 so that when the front end of the mounting plate is engaged between the two flanges 58, the packing wheel will follow directly behind the guide tube 48.

In use of the apparatus, the shank is drawn across the ground, with the sweep 14 below the ground surface to open a furrow into which seed is deposited through the seed boot 18. The loose soil around the deposited seed is then packed by the packer wheel or wheels, which are biased into firm engagement with the ground immediately behind the seed boot. The packer wheels follow the shank as a caster wheel to minimize lateral forces on the shank.

The mounting arrangement including the mounting flanges 58, the mounting plate 70 and the mounting bolts and bushings provide a quick attach function for the packer wheel, making it easy to remove, replace and adjust the packer wheel as desired.

While certain embodiments of the invention has been described in the foregoing by way of example, it is to be understood that other embodiments are possible within the scope of the invention. It is, for example, possible to vary the spring pressure by incorporating a stepped spring tension adjuster of the type used on motorcycle forks, shock absorbers, and the like. The invention is thus to be considered limited solely by the scope of the appended claims.

I claim:

1. A packer for mounting on a tool shank of an agricultural cultivator, the packer comprising:

an elongate support member comprising a rigid seed tube;

mounting means mounting the support member on the shank at a rear side of the shank;

guide means slidable along the support member;

resilient means biasing the guide means downwardly along the support member; and packer means mounted on the guide means at the rear side of the shank for packing soil behind the shank.

2. A packer according to claim 1 wherein the seed tube includes a seed delivery boot at a bottom end thereof.

3. A packer according to claim 2 including a ground opening tool and tool mounting bolts mounting the tool and the seed delivery boot on the shank.

4. A packer according to claim 3 wherein the mounting means include a bracket spaced from the seed boot for mounting the support member on the shank.

5. A packer according to claim 1 wherein the guide means comprise a tubular member rotatably and slideably mounted on the seed tube.

6. A packer according to claim 5 wherein the packer means comprise a packer wheel mounted on the tubular member, to the rear thereof.

7. A packer according to claim 5 wherein the packer means comprise two packer wheels mounted on the tubular member, to the rear thereof.

8. A packer according to claim 1 wherein the resilient means comprise a compression spring mounted on the seed tube.

9. A packer according to claim 8 including a spring seat on the seed tube and wherein the spring acts between the guide means and the spring seat.

10. A packer according to claim 1 wherein the packer means comprise a packer wheel.

11. Apparatus according to claim 10 where the packer means include means for adjusting the position of the packer wheel on the guide means.

12. A packer according to claim 11 wherein the guide means are rotatable around the support member and the packer wheel is positioned to the rear of the support member.

13. A packer according to claim 1 wherein the packer means comprise two packer wheels.

14. Apparatus according to claim 13 where the packer means include means for adjusting the position of the packer wheels on the guide means.

15. A packer according to claim 14 wherein the guide means are rotatable around the support member and the packer wheels are positioned to the rear of the support member.

16. A packer for mounting on a tool shank of an agricultural cultivator, the packer comprising:

an elongate support member;

mounting means mounting the support member on the shank at a rear side of the shank;

guide means slidable along the support member and rotatable around the support member;

resilient means biasing the guide means downwardly along the support member; and packer means mounted on the guide means at the rear side of the shank for packing soil behind the shank.

17. A packer according to claim 16 wherein the packer means comprise a packer wheel positioned to the rear of the support member.

18. A packer according to claim 16 wherein the packer means comprise two packer Wheels positioned to the rear of the support member.

19. A packer according to claim 16 wherein the resilient means comprise a spring mounted on the support member.

* * * * *